United States Patent
Gao

(10) Patent No.: US 11,614,729 B2
(45) Date of Patent: Mar. 28, 2023

(54) TIME-SPREAD CONTROL CYCLES FOR ROBOTIC SERVOMOTORS

(71) Applicant: ABB SCHWEIZ AG, Baden (CH)

(72) Inventor: Yang Gao, Västerås (SE)

(73) Assignee: ABB Schweiz AG, Baden (CH)

( * ) Notice: Subject to any disclaimer, the term of this patent is extended or adjusted under 35 U.S.C. 154(b) by 413 days.

(21) Appl. No.: 16/978,273

(22) PCT Filed: Mar. 9, 2018

(86) PCT No.: PCT/EP2018/055879
§ 371 (c)(1),
(2) Date: Sep. 4, 2020

(87) PCT Pub. No.: WO2019/170247
PCT Pub. Date: Sep. 12, 2019

(65) Prior Publication Data
US 2021/0011460 A1    Jan. 14, 2021

(51) Int. Cl.
*G05B 19/4155* (2006.01)
*B25J 9/12* (2006.01)
*H02P 27/08* (2006.01)

(52) U.S. Cl.
CPC ............ *G05B 19/4155* (2013.01); *B25J 9/12* (2013.01); *H02P 27/08* (2013.01); *G05B 2219/42237* (2013.01); *G05B 2219/50391* (2013.01)

(58) Field of Classification Search
CPC .......... H02P 27/00; H02P 27/04; H02P 27/06; H02P 24/08; H02P 27/085; H02P 25/00;
(Continued)

(56) References Cited

U.S. PATENT DOCUMENTS 9,007,013 B2    4/2015    Bae et al.
9,543,885 B2    1/2017    Saha et al.
(Continued)

FOREIGN PATENT DOCUMENTS

CN    105471361 A    4/2016
CN    106330045 A    1/2017
JP    2009284719 A    12/2009

OTHER PUBLICATIONS

Ruffo Riccardo et al: "Simple parameters estimation and precise over-voltage simulation in long cable connected drives"; IECON 2016—42nd Annual Conference of the IEEE Industrial Electronics Society; IEEE, Oct. 23, 2016 (Oct. 23, 2016); pp. 4362-4367 XP033033752; DOI:10.1109/IECON.2016.7793550 [retrieved on Dec. 21, 2016].

(Continued)

*Primary Examiner* — Antony M Paul
(74) *Attorney, Agent, or Firm* — Whitmyer IP Group LLC

(57) ABSTRACT

A method of controlling a drive including one respective inverter associated with each of a plurality of servomotors in a robot. The method includes providing a PWM frequency corresponding to a frequency of switching instances for respective semiconductor switches in each of the inverters, whereby for each inverter time is divided into consecutive control cycles forming a sequence of control cycles of the inverter, each control cycle containing two, and only two, of the switching instances for each of the semiconductor switches. The method also includes spreading the respective control cycle sequences of the inverters over time such that the control cycles of each inverter are time shifted in respect to the control cycles of each of the other inverters in the power converter.

15 Claims, 3 Drawing Sheets

(58) Field of Classification Search
CPC .... H02P 25/022; H02P 25/062; H02P 25/064; H02P 25/107; H02P 25/145; H02P 29/00; H02P 2209/05; H02P 1/00; H02P 1/24; H02P 1/426; H02P 1/46; H02P 1/465; H02P 1/54; H02P 6/00; H02P 6/04; H02P 6/32; H02P 7/00; H02P 7/29; H02P 21/00; H02P 21/0085; H02P 23/28; G05B 19/05391

See application file for complete search history.

(56) References Cited

U.S. PATENT DOCUMENTS

| | | | |
|---|---|---|---|
| 9,796,276 B2 | 10/2017 | Kim et al. | |
| 2013/0264872 A1* | 10/2013 | Tago | H02M 7/003 307/31 |
| 2014/0306452 A1 | 10/2014 | White et al. | |
| 2016/0004810 A1 | 1/2016 | Solodovnik et al. | |
| 2016/0118866 A1 | 4/2016 | Yamazaki et al. | |
| 2017/0144567 A1 | 5/2017 | Takagi | |

OTHER PUBLICATIONS

"Adjustable speed electrical power drive systems—Part 9-2: Ecodesign for power drive systems, motor starters, power electronics and their driven applications—Energy efficiency indicators for power drive systems and motor starters"; IEC 61800-9-2:2017; IEC, 3, Rue De Varembe, PO Box 131, CH-1211 Geneva 20, Switzerland; Mar. 3, 2017 (Mar. 3, 2017); pp. 1-226, XP082011391, [retrieved on Mar. 3, 2017].

Servo Sew Eurodrive: "Gearmotors \ Industrial Gear Units Drive Electronics \ Drive Automation \ Services Drive Engineering— Practical Implementation" Sep. 30, 2006 (Sep. 30, 2006); XP055690620; Retrieved from the Internet: URL:https://download.sew-eurodrive.com/download/pdf/1132281 0.pdf ; [retrieved on Apr. 30, 2020].

PCT International Search Report & Written Opinion of the International Searching Authority; Application No. PCTEP2018055879; Completed: Sep. 28, 2018; dated Oct. 9, 2018; 11 Pages.

PCT International Preliminary Report on Patentability; Application No. PCTEP2018055879; dated Jun. 17, 2020; 22 Pages.

* cited by examiner

TIME-SPREAD CONTROL CYCLES FOR ROBOTIC SERVOMOTORS

TECHNICAL FIELD

The present disclosure relates to a method and device for controlling a drive for servomotors of a robot.

BACKGROUND

A robot, e.g. a robotic arm, comprises a plurality of servomotors, typically one per joint or axis, which are controlled by a drive external to the robot. The drive comprises a power converter with one inverter per servomotor outputting an Alternating Current (AC) with a suitable electrical frequency for driving the servomotor at a speed controlled by a servo computer of the servomotor. The electrical frequency needed depends on the desired maximum speed of the servomotor and the number of poles of said servomotor. To produce the electrical frequency, the inverter comprises a plurality of semiconductor switches controlled by a Pulse-Width Modulation (PWM) technique with a PWM switching frequency suitable for producing the electrical frequency outputted from each inverter. Thus, if an increased maximum speed of the servomotor is desired and/or if a servomotor with an increased number of poles is used, the PWM switching frequency has to be increased accordingly. However, a higher PWM switching frequency typically results in higher switching losses and Electromagnetic Compatibility (EMC) issues.

SUMMARY

An objective of the present invention is to alleviate problems with more severe EMC issues resulting from increased PWM switching frequency of a robot drive.

According to an aspect of the present invention, there is provided a method of controlling a drive comprising a power converter comprising one respective inverter associated with each of a plurality of servomotors in a robot. The method comprises providing a PWM frequency corresponding to a frequency of switching instances for respective semiconductor switches in each of the inverters, whereby for each inverter time is divided into consecutive control cycles forming a sequence of control cycles of the inverter, each control cycle containing two, and only two, of the switching instances for each of the semiconductor switches. The method also comprises spreading the respective control cycle sequences of the inverters over time such that the control cycles of each inverter are time shifted in respect to the control cycles of each of the other inverters in the power converter. The method also comprises sending firing pulses to the semiconductor switches in each of the inverters in accordance with the spread control cycles. The method also comprises, from each of the inverters, outputting an alternating current having an electrical frequency formed by the inverter in response to the sent firing pulses, to the servomotor associated with the inverter via an electrical connection.

According to another aspect of the present invention, there is provided a computer program product comprising computer-executable components for causing a control arrangement to perform an embodiment of the method of the present disclosure when the computer-executable components are run on processing circuitry comprised in the control arrangement.

According to another aspect of the present invention, there is provided a drive for a plurality of servomotors in a robot. The drive comprises a power converter comprising one respective inverter for each of the servomotors, and a control arrangement. The control arrangement comprises processing circuitry, and data storage storing instructions executable by said processing circuitry whereby said control arrangement is operative to provide a PWM frequency corresponding to a frequency of switching instances for respective semiconductor switches in each of the inverters, whereby for each inverter time is divided into consecutive control cycles forming a sequence of control cycles of the inverter, each control cycle containing two, and only two, of the switching instances for each of the semiconductor switches. The control arrangement is also operative to spread the respective control cycle sequences of the inverters over time such that the control cycles of each inverter are time shifted in respect to the control cycles of each of the other inverters in the power converter. The control arrangement is also operative to send firing pulses to the semiconductor switches in each of the inverters in accordance with the spread control cycle sequences. The control arrangement is also operative to, from each of the inverters, output an alternating current having an electrical frequency formed by the inverter in response to the sent firing pulses, to the servomotor associated with the inverter via an electrical connection.

According to another aspect of the present invention, there is provided a robot arrangement comprising an embodiment of the drive of the present disclosure, the robot comprising the servomotors, and the electrical connections between the inverters and their respective associated motors.

In accordance with the present invention, the respective control cycle sequences of the inverters are spread over time, avoiding superpositioning of electromagnetic fields of the different inverters, relating to the switching of the inverter switches, thus reducing EMC issues.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
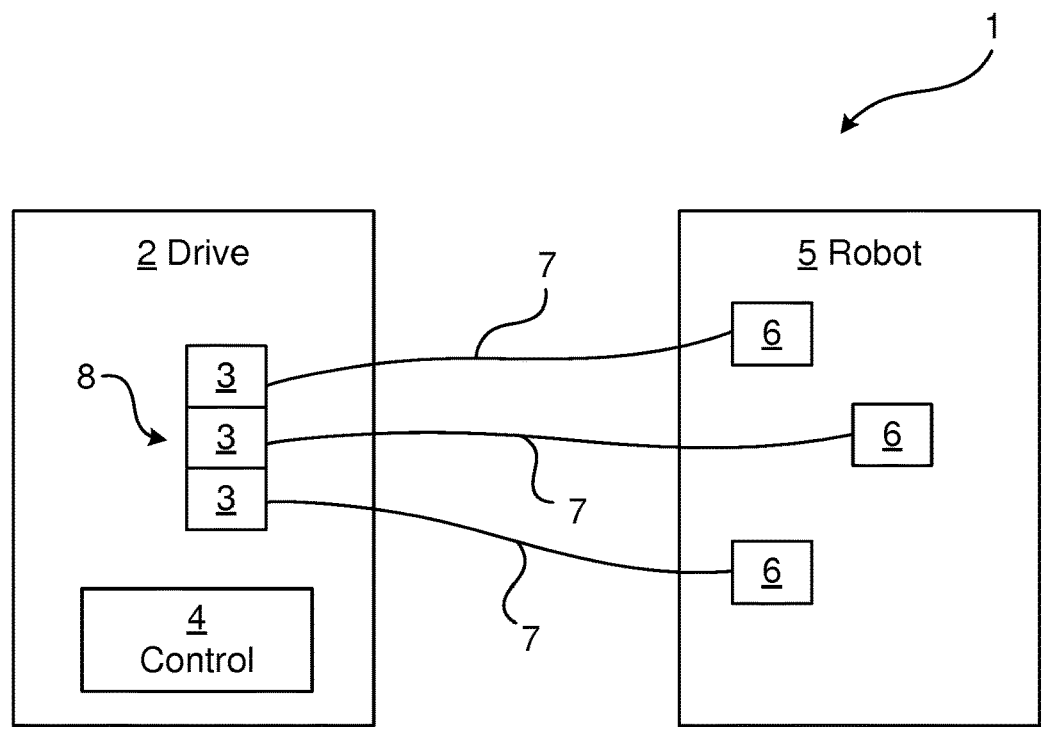
FIG. 1 is a schematic block diagram of an embodiment of a robot arrangement, in accordance with the present invention.

FIG. 1 illustrates a robot arrangement 1 comprising a drive 2 and a robot 5. The drive comprises a control arrangement 4 and a power converter 8, wherein the power converter 8 comprises a plurality of inverters 3, each of which inverters 3 being electrically connected to, and thus associated with, a respective electrical servomotor 6 in the robot 5 via an electrical connection 7.

The robot 5, e.g. a robotic arm, comprises the plurality of servomotors 6, typically one per joint or axis, which are controlled by means of a respective Alternating Current (AC) outputted by each inverter 3 and fed to the servomotor 6 associated with the inverter via the electrical connection 7. At least a part of the drive 2 is external to the robot 5, which implies that the electrical connections 7 will be relatively long, such as with a length of up to 50 metres or even longer. The electrical connections 7 connect the drive 2 to the robot 5, and may partly or fully be regarded as part of either or both of the drive and robot.

The drive 2 comprises the power converter 8 which comprises one inverter 3 per servomotor 6. Each inverter outputs the AC current with a suitable electrical frequency for driving the respective servomotor at a speed controlled by a servo computer of the respective servomotor, wherein the electrical frequency is high enough for allowing the servo computer to control the respective servomotor to a desired maximum speed (as measured in rounds per minute, rpm). Thus, the electrical frequency needed depends on the desired maximum speed of the servomotor, but also on the number of poles of said servomotor 6. Typically, the required electrical frequency ($f_{AC}$), in Hertz (Hz), is the desired maximum motor speed (a), in rpm/60 to get rounds per seconds, times the number of poles (n) divided by 2:

$$f_{AC}=\omega \cdot n/2 \quad (1)$$

To produce the electrical frequency, the inverter comprises a plurality of semiconductor switches S (see FIG. 2) controlled by a Pulse-Width Modulation (PWM) technique with a PWM switching frequency ($f_{PWM}$), in Hz, suitable for producing the electrical frequency outputted from each inverter.

Thus, if an increased maximum speed of the servomotor is desired and/or if a servomotor with an increased number of poles is used, the PWM switching frequency has to be increased accordingly. The PWM switching frequency may have a multiple (m) which is typically within the range of 8-16, implying that the PWM switching frequency is 8 to 16 times higher than the resulting outputted electrical frequency:

$$f_{PWM}=m \cdot f_{AC}=m \cdot \omega \cdot n/2 \quad (2)$$

However, as mentioned above, a higher PWM switching frequency typically results in higher switching losses and Electromagnetic Compatibility (EMC) issues. These EMC issues are accentuated with longer electrical connections 7 due to the increase of the inductance on the electrical connection, e.g. a cable.

The drive 2 also comprises the control arrangement 4, which may be arranged to perform embodiments of the method disclosed herein. The control arrangement may comprise a single or a plurality of physical control units, e.g. a central control unit and a respective local control unit for each inverter 3 and/or servomotor 6 which may or may not be co-located with said inverter and/or servomotor.

At least a part of the drive 2, including the power converter 8, is typically located externally of the robot 5, such as in a cabinet some distance away from the robot. This distance implies that the electrical connections 7 may need to be relatively long which increases the problem with EMC issues. However, it is not precluded that some parts of the drive, e.g. some local control units of the control arrangement 4, may be housed inside or attached to the robot.

Figure 2:
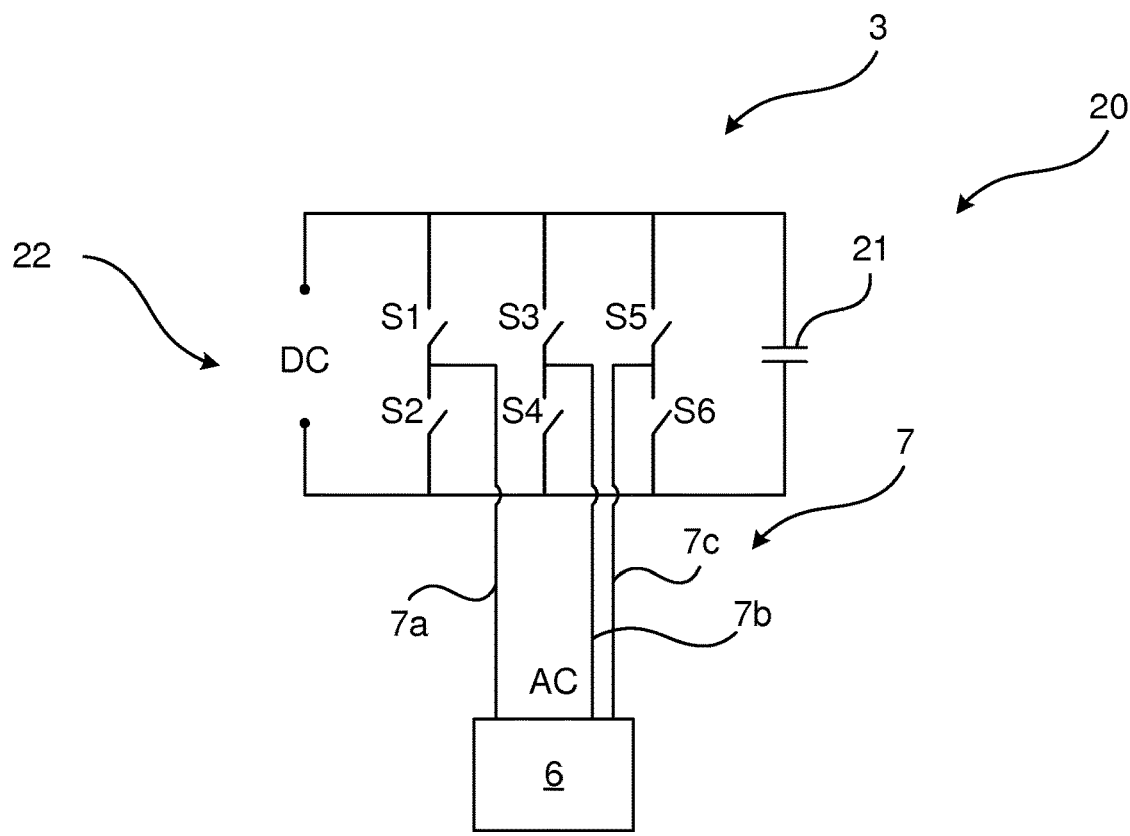
FIG. 2 is a schematic circuit diagram of an embodiment of an inverter of a robot drive connected to a servomotor of a robot, in accordance with the present invention.

FIG. 2 illustrates an embodiment of one of the inverters 3 in FIG. 1. The inverter is connected to a Direct Current (DC) source, herein called a DC bus 22, to which DC bus also the other inverters 3 of the power transformer 8 may be connected. The inverter comprises a capacitor arrangement 21, comprising any number of at least one capacitor, as well as three legs of semiconductor switches S, one leg per phase of the outputted AC current. In the embodiment of FIG. 2, the inverter 3 comprises six semiconductor switches S1-S6, two per inverter leg such that the electrical connection 7 is connected between said two semiconductor switches to conduct the AC current formed by the alternating switching of the two switches. Thus, a first inverter leg comprises a first switch S1 and a second switch S2 with a first line 7a of the electrical connection 7 connected there between, a third switch S3 and a fourth switch S4 with a second line 7b of the electrical connection 7 connected there between, and a fifth switch S5 and a sixth switch S6 with a third line 7c of the electrical connection 7 connected there between. The inverter 3 and the electrical connection 7, and optionally also the associated motor 3, may be regarded as part of the drive train 20 of the motor.

Each semiconductor switch S comprises at least one semiconductor switching device, e.g. an Insulated-Gate Bipolar Transistor (IGBT), a Metal-Oxide-Semiconductor Field-Effect Transistor (MOSFET), and/or a device based on Gallium Nitride (GaN) or Silicon Carbide (SiC).

Figure 3A:
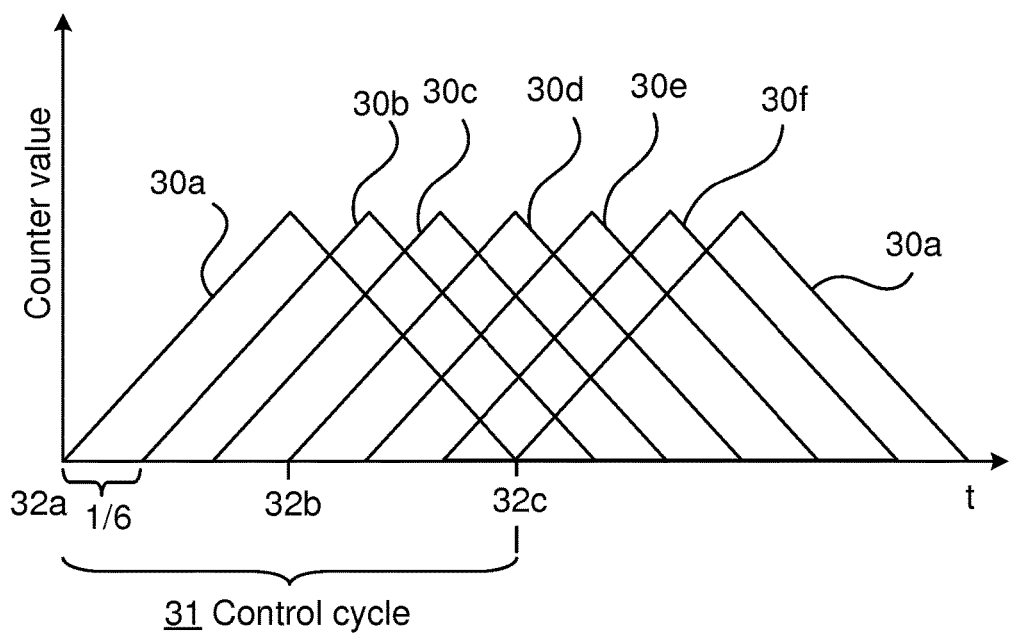
FIG. 3a is a schematic graph illustrating an embodiment of PWM switching times counter values which are used to count for PWM switch on/off time within the control cycle sequences for a plurality of inverters of a robot drive, spread over time, in accordance with the present invention.

FIG. 3a illustrates the spreading over time of the control cycle sequences for the plurality of inverters 3. In the embodiment of FIG. 3a there are six inverters, each with its respective sequence of consecutive control cycles 3i. Typically, all the control cycle sequences have the same period, e.g. 126 μs per control cycle 31, corresponding to 8 kHz. The graph schematically shows switching time counter values 30 over time (t) of each of the six inverters, a first counter value 30a for the first inverter, a second counter value 30b for the second inverter, a third counter value 30c for the third inverter, a fourth counter value 30d for the fourth inverter, a fifth counter value 30e for the fifth inverter, and a sixth counter value 30f for the sixth inverter of the power converter 8. Each control cycle 3i comprises two, and only two, switching instances for each of the switches S in an inverter 3, the switching instances being defined on the basis of the respective counter value 30. That is, a first switching instance for each switch S in the inverter, e.g. switches S1-S6 as in FIG. 2, between a start time point 32a (at the start of the control cycle) and a middle time point 32b (at the middle of the control cycle, illustrated by a peak of the counter value 30 in FIG. 3), and a second switching instance for each switch S in the inverter between the middle time point 32b and an end time point 32c (at the end of the control cycle). For each of the counter values 30, the counter counts up until all switches S of the inverter have switched at their respective first switching instances and then counts down until all switches S of the inverter have switched at their respective second switching instances of the control cycle 31. For instance, at the first switching instance, the switches S1, S3 and S5 may be turned on (conducting), and the switches S2, S4 and S6 may be turned off (not conducting), while at the second switching instance, the switches S1, S3 and S5 may be turned off, and the switches S2, S4 and S6 may be turned on.

Figure 3B:
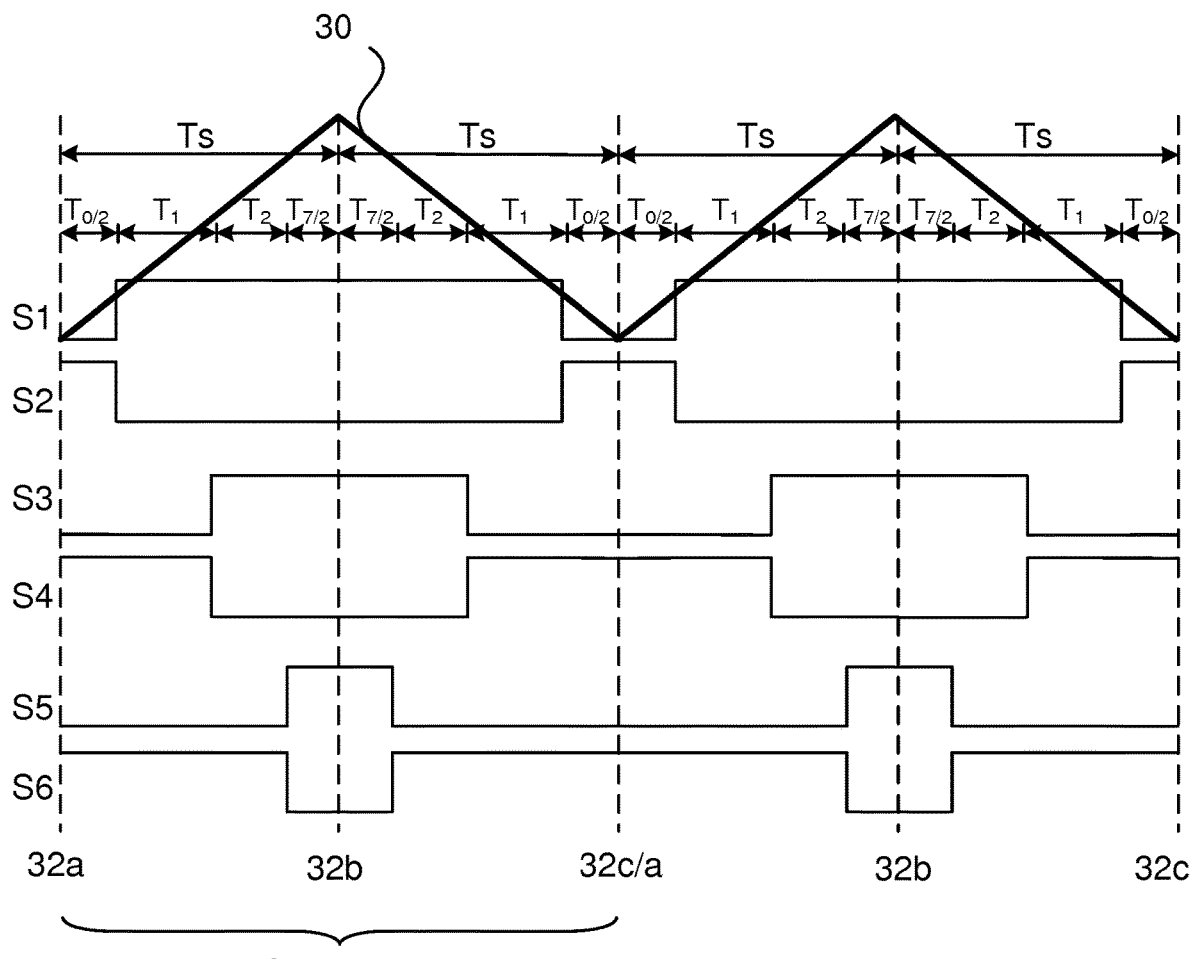
FIG. 3b is a schematic graph illustrating switching instances of the different semiconductor switches of an inverter within its control cycle.

In FIGS. 3a and 3b, the control cycle 31, and the start, middle and end time points 32a-c of that control cycle, are marked for the first counter value 30a of the first inverter 3, but it is correspondingly the same also for the other counter values 30b-f of the other inverters. The first counter value 30a is also the only one for which more than one control cycle is shown of its control cycle sequence, but of course each of the control cycle sequences comprises any number of consecutive control cycles 31.

Conventionally, all inverters in the power converter have their respective switching instances at, or close to, the same time, i.e. all the counter values 30 in the graph are superpositioned. However, this implies that the electromagnetic effects of the inverters amplify each other, resulting in increased EMC and ripple current issues. These issues may be further increased with increasing length of the electrical connection 7.

However, in accordance with the present invention, the respective control cycle sequences of the inverters 3 are spread over time, as illustrated in FIGS. 3a and 3b by the counter values 30 being time shifted in relation to each other so as to avoid superpositioning. Thus, as illustrated by the respective peak of the counters values 30, for instance the first switching instant, between time points 32a and 32b, of each of the control cycle sequences, i.e. of each inverter, is time shifted in respect of the respective first switching instant of each of the other inverters, and the same is correspondingly true for the second switching instant. No two of the start time points 32a, of the middle time points 32b or of the end time points 32c of the plurality of inverters 3 occur at the same time (i.e. they are not superpositioned).

Preferably, respective control cycle sequences, and thus the start, middle and end time points 32a-c, respectively, of the different inverters 3 of the power converter 8 are evenly spread over time. This implies that, for each of the control cycle sequences, the time shift between a start, middle and end time point 32a-c, respectively, and a corresponding start, middle and end time point 32a-c, respectively, which is closest in time to the start, middle and end time point, respectively, of said each control cycle sequence, of any of the other control cycle sequences is defined as the period of the control cycle 31 divided by the number of inverters 3. In the embodiment of FIG. 3a, the number of inverters is six, why the time shift is ⅙ of the control cycle period, e.g. 126 μs/6=21 μs. Put another way, the middle time point 32b (corresponding to the peaks of the counter values 30), or the start/end time points 32a/c (corresponding to the valley bottoms of the counter values 30), of all the inverters 3 of the power converter 8 form a sequence of equidistantly spaced time points where the space (i.e. the time shift, as discussed herein) is the period of the control cycle 31 divided by the number of inverters 3. However, the important thing is that the start, middle and end time points 32a-c of different inverters do not overlap (superposition). To evenly spread them is only a preferred way of achieving this.

The exact time points the first and second switching instances of each respective switch S in an inverter 3, within its control cycle, are controlled by each inverter controller of the control arrangement 4. FIG. 3b illustrates an example of how switches S in an inverter having six switches S1-S6 (as in FIG. 2) may be switched in time. The counter value 30 over time for the inverter is shown for two consecutive control cycles 31. As is dictated by the inverter design (see FIG. 2), the switches are switched pairwise such that the first and second switches S1 and S2 are always switched simultaneously, one on and the other off, the third and fourth switches S3 and S4 are always switched simultaneously, one on and the other off, and the fifth and the sixth switches S5 and S6 are always switched simultaneously, one on and the other off. Each control cycle 31 is divided into two switching time ranges Ts, one for the first switching instances of all switches S1-S6 of the inverter, and one for the second switching instances of all switches S1-S6 of the inverter. All switch pairs may not be switched simultaneously for their first and second switching instances. Rather, as illustrated in FIG. 3b, each pair switches at a respective time point within each switching time range Ts which is different from the time points of the other pairs. The time periods $T_0$, $T_1$, $T_2$ and $T_7$ may be chosen in a conventional manner and implemented by the inverter controller.

Figure 4:
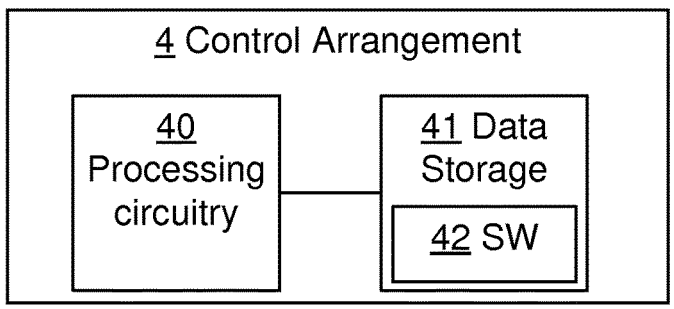
FIG. 4 is a schematic block diagram of an embodiment of a control arrangement, in accordance with the present invention.

FIG. 4 schematically illustrates an embodiment of the control arrangement 4 of the present disclosure. The control arrangement 4 comprises processing circuitry 40 e.g. a central processing unit (CPU). The processing circuitry 40 may comprise one or a plurality of processing units in the form of microprocessor(s). However, other suitable devices with computing capabilities could be comprised in the processing circuitry 40, e.g. an application specific integrated circuit (ASIC), a field programmable gate array (FPGA) or a complex programmable logic device (CPLD). The processing circuitry 40 is configured to run one or several computer program(s) or software (SW) 42 stored in a data storage 41 of one or several storage unit(s) e.g. a memory. The storage unit is regarded as a computer readable means or computer program product as discussed herein and may e.g. be in the form of a Random Access Memory (RAM), a Flash memory or other solid state memory, or a hard disk, or be a combination thereof. The processing circuitry 40 may also be configured to store data in the storage 41, as needed. The control arrangement 4 may further comprise other conventional parts for enabling or facilitating control of the inverters 3, e.g. a communication interface for wired or wireless communication within the control arrangement or with other parts of the drive or with nodes external to the drive, and/or means for sending firing pulses to the semiconductor switches S for controlling the on/off switching thereof.

Figure 5:
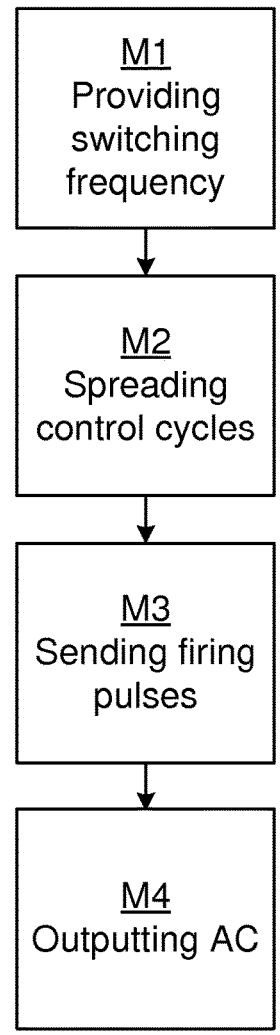
FIG. 5 is a schematic flow-chart of an embodiment of the control method of the present invention.

FIG. 5 is a flow-chart of an embodiment of the method of the present disclosure. The method is for controlling the drive 2 comprising the power converter 8. The power converter comprises one respective inverter 3 associated with each of a plurality of the servomotors 6 in the robot 5.

The method comprises providing M1 a PWM switching frequency corresponding to a frequency of switching instances 32 for respective semiconductor switches S, e.g. S1-S6 as in FIG. 2, in each of the inverters 3, whereby for each inverter time is divided into consecutive control cycles 31 forming a sequence of control cycles of the inverter. Each control cycle 31 contains two, and only two, of the switching instances, e.g. a first switching instance 32a and a second switching instance 32b as discussed in relation to FIG. 3.

The method also comprises spreading M2 the respective control cycle sequences of the inverters 3 over time such that the control cycles 31, and thus the switching instances 32, of each inverter 3 are time shifted in respect to the control cycles of each of the other inverters in the power converter 8.

The method also comprises sending M3 firing pulses to the semiconductor switches S in each of the inverters 3 in accordance with the spread M2 control cycles.

The method also comprises, from each of the inverters 3, outputting M4 an alternating current having an electrical frequency formed by the inverter 3 in response to the sent M3 firing pulses, to the servomotor 6 associated with the inverter via an electrical connection 7.

Embodiments of the present invention alleviates EMC issues, e.g. allowing the PWM frequency to be increased, whereby the maximum speed of the servomotors may be increased and/or the number of poles of the servomotors may be increased.

Additionally or alternatively, the increased switching losses resulting from the increased PWM frequency may be reduced by means of using a dynamic PWM frequency. Thus, the PWM frequency may be controlled based on the highest speed at which any of the servomotors 6 are currently running, whereby the PWM frequency is reduced when none of the servomotors are running at maximum speed, i.e. the motor speed ω in equation (2) may be set dynamically based on the presently required highest speed of any of the servomotors 6. For instance, the motor speed ω in equation (2) may be changed between two or more predetermined levels, e.g. high and low, where low may e.g. be half or two thirds of high, resulting in various levels of the PWM frequency used for the switching of the switches S in the inverters 3. Thus, the switching losses and resulting costs may be reduced.

It follows that in some embodiments of the present invention, the provided M1 PWM frequency is set dynamically based on a present highest motor speed of any of the servomotors 6.

Additionally or alternatively, in some embodiments of the present invention, the provided M1 PWM frequency is at least 6 kHz, e.g. within the range of 6.4-12.8 kHz (corresponding to a multiple m of 8-16 for 16-pole servomotors with a maximum speed co of 6000 rpm).

Additionally or alternatively, in some embodiments of the present invention, the outputted M4 electrical frequency is at least 0.6 kHz, e.g. at least 0.8 kHz, such as within the range of 0.8-1.6 kHz.

Additionally or alternatively, in some embodiments of the present invention, the control cycle sequences are evenly spread over time such that, for each of the control cycle sequences, the time shift between a first switching instance 32a of the control cycle sequence and a corresponding switching instance, which is closest in time to the first switching instance, of any of the other control cycle sequences is defined as the period of the control cycle 31 divided by the number of inverters 3, as discussed above in relation to FIG. 3.

Additionally or alternatively, in some embodiments of the present invention, each of the control cycles for each of the inverters (3) has a period within the range of 100-150 µs, e.g. 126 µs.

Additionally or alternatively, in some embodiments of the present invention, the power converter 8 comprises at least four inverters 3, such as at least six inverters, e.g. all connected to the same DC bus 22 of the power converter. Embodiments of the present invention are especially useful when many inverters are used, since the EMC amplification which is then potentially caused by superpositioning is greater.

Additionally or alternatively, in some embodiments of the present invention, each of the electrical connections 7 has a length of at least 10 metres, e.g. at least 30 or 50 metres, and/or up to 200, 100 or 50 metres. Embodiments of the present invention are especially useful when the electrical connections, e.g. electrical cables, are long due to the increase of the inductance in the electrical connection.

Additionally or alternatively, in some embodiments of the present invention, each of the servomotors 6 has at least sixteen poles. Embodiments of the present invention are especially useful with servomotors with increased number of poles since the higher number of poles requires a higher PWM frequency. However, embodiments of the present invention may still also be useful with servomotors with fewer poles, e.g. with 8 or 12 poles.

Embodiments of the present invention may be conveniently implemented using one or more conventional general purpose or specialized digital computer, computing device, machine, or microprocessor, including one or more processors 40, memory and/or computer readable storage media 41 programmed according to the teachings of the present disclosure. Appropriate software coding can readily be prepared by skilled programmers based on the teachings of the present disclosure, as will be apparent to those skilled in the software art.

In some embodiments, the present invention includes a computer program product 41 which is a non-transitory storage medium or computer readable medium (media) having instructions 42 stored thereon/in, in the form of computer-executable components or software (SW), which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method of controlling a drive having a power converter including one respective inverter associated with each of a plurality of servomotors in a robot, the power converter being located externally of the robot, the method comprising:

providing a Pulse-Width Modulation, PWM, frequency corresponding to a frequency of switching instances for respective semiconductor switches in each of the inverters, whereby for each inverter time is divided into consecutive control cycles forming a control cycle sequence of the inverter, each control cycle containing two, and only two, of the switching instances for each of the semiconductor switches;

spreading the respective control cycle sequences of the inverters over time such that the control cycle sequence of each inverter is time shifted in respect to the control cycle sequence of each of the other inverters in the power converter;

sending firing pulses to the semiconductor switches in each of the inverters in accordance with the spread control cycles; and from each of the inverters, outputting an alternating current having an electrical frequency formed by the inverter in response to the sent firing pulses, to the servomotor associated with the inverter via an electrical connection having a length of at least 10 meters;

wherein the provided PWM frequency is set dynamically based on a present highest motor speed of any of the servomotors.

2. The method of claim 1, wherein the provided PWM frequency is at least 6 kHz, e.g. within the range of 6.4-12.8 kHz.

3. The method of claim 2, wherein the control cycle sequences are evenly spread over time such that, for each of the control cycle sequences, the time shift between a first switching instance of the control cycle sequence and a corresponding switching instance, which is closest in time to the first switching instance, of any of the other control cycle sequences is defined as the period of the control cycle divided by the number of inverters.

4. The method of claim 2, wherein each of the control cycles for each of the inverters has a period within the range of 100-150 μs.

5. The method of claim 2, wherein the power converter comprises at least four inverters, such as at least six inverters, e.g., all connected to the same DC bus of the power converter.

6. The method of claim 1, wherein the outputted electrical frequency is at least 0.6 kHz, e.g. at least 0.8 kHz, such as within the range of 0.8 1.6 kHz.

7. The method of claim 1, wherein the control cycle sequences are evenly spread over time such that, for each of the control cycle sequences, the time shift between a first switching instance of the control cycle sequence and a corresponding switching instance, which is closest in time to the first switching instance, of any of the other control cycle sequences is defined as the period of the control cycle divided by the number of inverters.

8. The method of claim 1, wherein each of the control cycles for each of the inverters has a period within the range of 100-150 μs.

9. The method of claim 1, wherein the power converter comprises at least four inverters, such as at least six inverters, e.g. all connected to the same DC bus of the power converter.

10. A computer program product comprising computer-executable components for causing a control arrangement to perform the method of:

providing a Pulse-Width Modulation, PWM, frequency corresponding to a frequency of switching instances for respective semiconductor switches in each of the inverters, whereby for each inverter time is divided into consecutive control cycles forming a control cycle sequence of the inverter, each control cycle containing two, and only two, of the switching instances for each of the semiconductor switches;

spreading the respective control cycle sequences of the inverters over time such that the control cycle sequence of each inverter is time shifted in respect to the control cycle sequence of each of the other inverters in the power converter;

sending firing pulses to the semiconductor switches in each of the inverters in accordance with the spread control cycles; and from each of the inverters, outputting an alternating current having an electrical frequency formed by the inverter in response to the sent firing pulses, to the servomotor associated with the inverter via an electrical connection having a length of at least 10 meters;

wherein the provided PWM frequency is set dynamically based on a present highest motor speed of any of the servomotors.

11. A drive for a plurality of servomotors in a robot, the drive comprising:

a power converter located externally of the robot and including one respective inverter for each of the servomotors; and a control arrangement;

wherein the control arrangement includes:

processing circuitry; and data storage storing instructions executable by said processing circuitry whereby said control arrangement is operative to:

provide a Pulse-Width Modulation, PWM, frequency corresponding to a frequency of switching instances for respective semiconductor switches in each of the inverters, whereby for each inverter time is divided into consecutive control cycles forming a control cycle sequence of the inverter, each control cycle containing two, and only two, of the switching instances for each of the semiconductor switches;

spread the respective control cycle sequences of the inverters over time such that the control cycle sequence of each inverter is time shifted in respect to the control cycle sequence of each of the other inverters in the power converter;

send firing pulses to the semiconductor switches in each of the inverters in accordance with the spread control cycle sequences; and from each of the inverters, output an alternating current having an electrical frequency formed by the inverter in response to the sent firing pulses, to the servomotor associated with the inverter via an electrical connection having a length of at least 10 meters;

wherein the provided PWM frequency is set dynamically based on a present highest motor speed of any of the servomotors.

12. A robot arrangement comprising:

the drive having:

a power converter located externally of the robot and including one respective inverter for each of the servomotors; and a control arrangement;

wherein the control arrangement includes:

processing circuitry; and data storage storing instructions executable by said processing circuitry whereby said control arrangement is operative to:

provide a Pulse-Width Modulation, PWM, frequency corresponding to a frequency of switching instances for respective semiconductor switches in each of the inverters, whereby for each inverter time is divided into consecutive control cycles forming a control cycle sequence of the inverter, each control cycle containing two, and only two, of the switching instances for each of the semiconductor switches;

spread the respective control cycle sequences of the inverters over time such that the control cycle sequence of each inverter is time shifted in respect to the control cycle sequence of each of the other inverters in the power converter;

send firing pulses to the semiconductor switches in each of the inverters in accordance with the spread control cycle sequences; and from each of the inverters, output an alternating current having an electrical frequency formed by the inverter in response to the sent firing pulses, to the servomotor associated with the inverter via an electrical connection having a length of at least 10 meters;

wherein the provided PWM frequency is set dynamically based on a present highest motor speed of any of the servomotors;

the robot including the servomotors; and the electrical connections between the inverters and their respective associated motors.

13. The robot arrangement of claim 12, wherein each of the electrical connections has a length of at least 30 or 50 meters.

14. The robot arrangement of claim 13, wherein each of the servomotors has at least sixteen poles.

15. The robot arrangement of claim 12, wherein each of the servomotors has at least sixteen poles.

* * * * *